Figure 1:
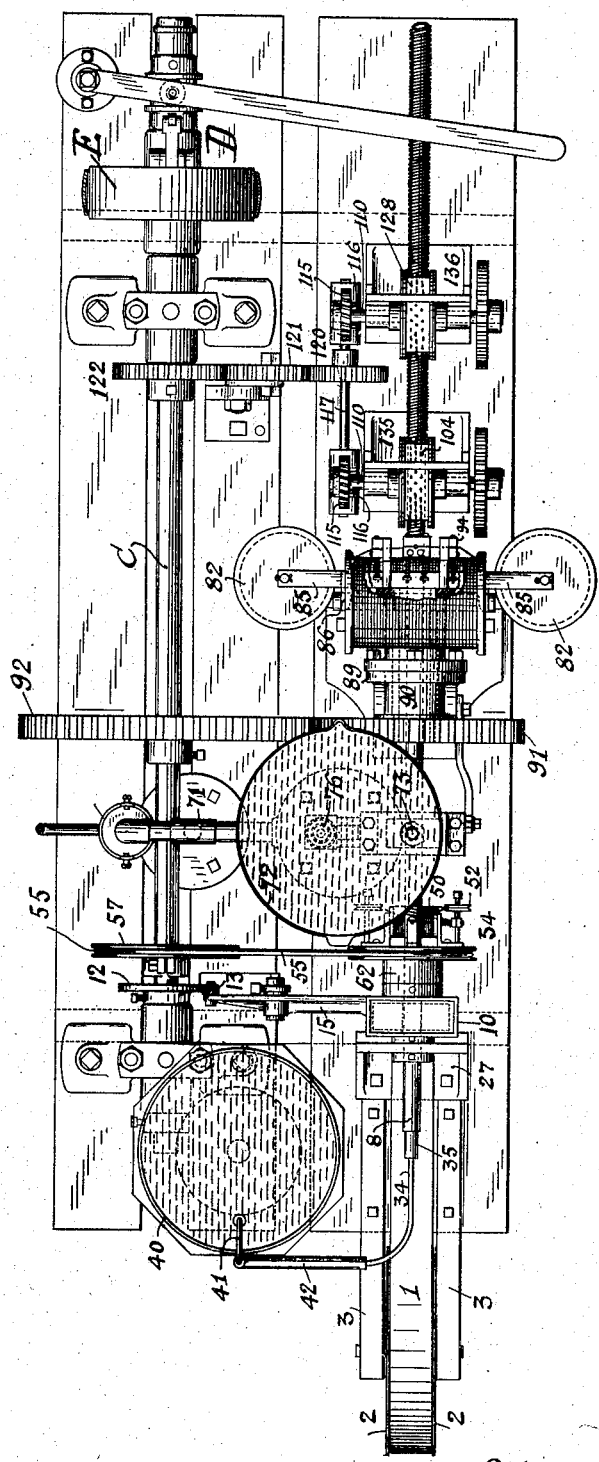

No. 791,729. PATENTED JUNE 6, 1905.
E. D. SPEER.
MACHINE FOR MANUFACTURING HOSE OR TUBES.
APPLICATION FILED MAY 15, 1903.

4 SHEETS—SHEET 1.

Witnesses
Charles Hanimann
Charles Kim

Inventor
Edward D. Speer
By his Attorney
Walter Brown

No. 791,729. PATENTED JUNE 6, 1905.
E. D. SPEER.
MACHINE FOR MANUFACTURING HOSE OR TUBES.
APPLICATION FILED MAY 15, 1903.
4 SHEETS—SHEET 2.
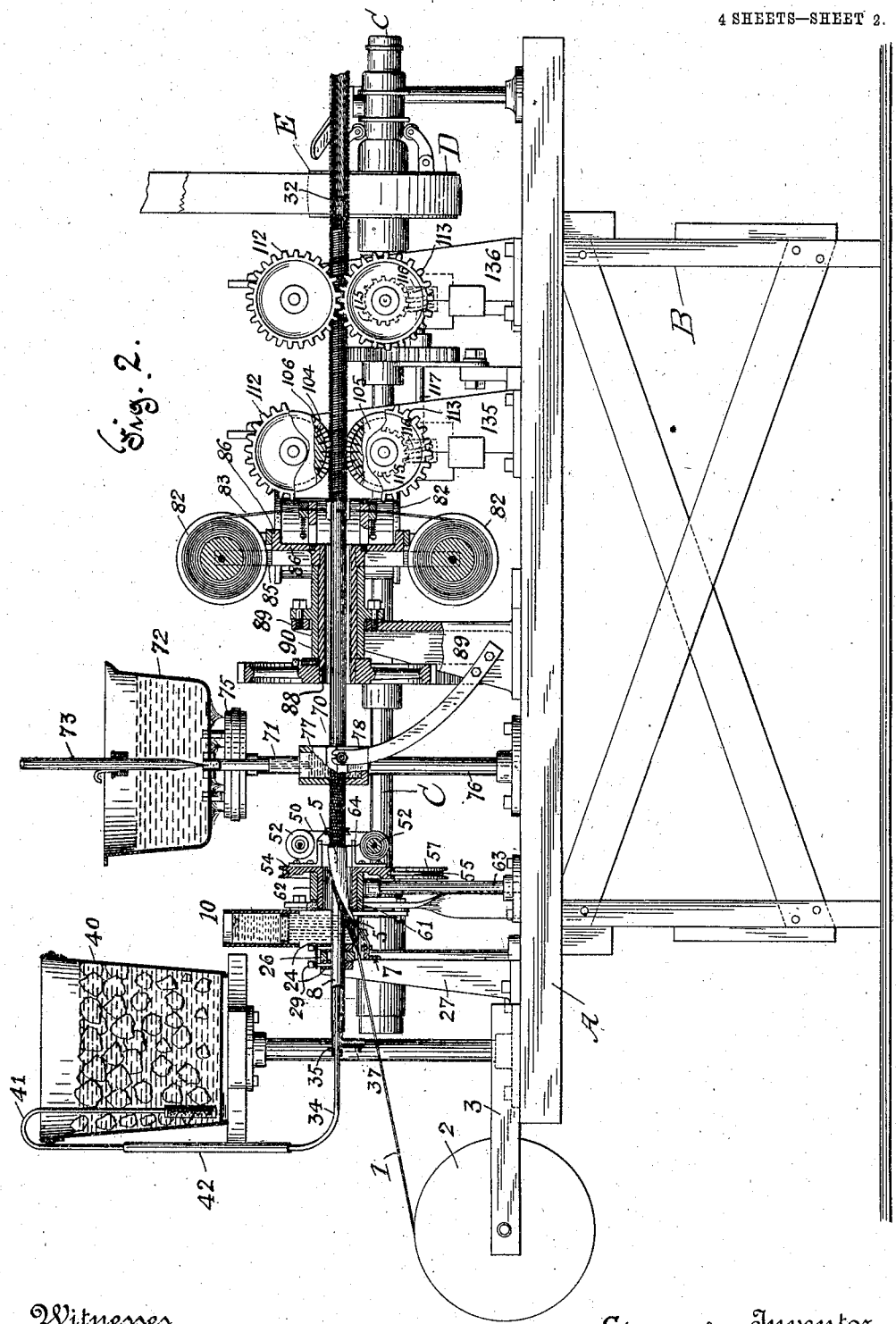

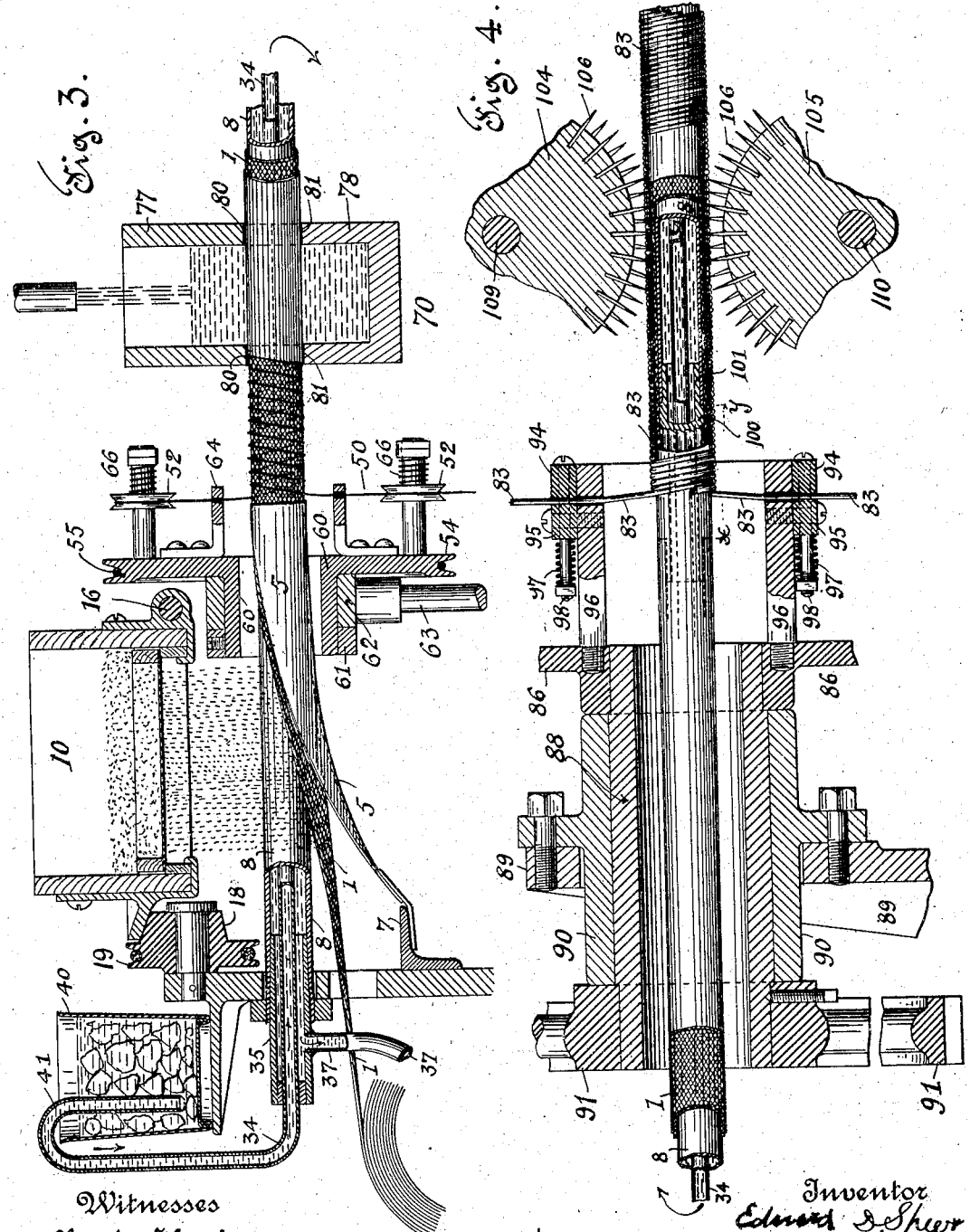

No. 791,729. PATENTED JUNE 6, 1905.
E. D. SPEER.
MACHINE FOR MANUFACTURING HOSE OR TUBES.
APPLICATION FILED MAY 15, 1903.

4 SHEETS—SHEET 4.

Witnesses
Charles Hanimann
Charles Klein

Inventor
Edward D. Speer
By his Attorney
D. Walter Brown

No. 791,729.

Patented June 6, 1905.

UNITED STATES PATENT OFFICE.

EDWARD D. SPEER, OF NEW YORK, N. Y.

MACHINE FOR MANUFACTURING HOSE OR TUBES.

SPECIFICATION forming part of Letters Patent No. 791,729, dated June 6, 1905.

Application filed May 15, 1903. Serial No. 157,300.

*To all whom it may concern:*

Be it known that I, EDWARD D. SPEER, a citizen of the United States of America, and a resident of the borough of Manhattan, city of New York, State of New York, have invented certain new and useful Improvements in Machines for Manufacturing Hose or Tubes, of which the following is a specification.

This invention relates to machines for manufacturing hose or tubes, and particularly conduits for electric wires.

While the principles of the construction of the machine are particularly adapted to manufacturing conduits for electric wires, they are also applicable to machines for manufacturing all tubes and pipes which contain an inner longitudinal lining on which is a reinforcing-winding of a filamentary body and weather-proof coating, like pitch, which will harden when cold or dry, and the machine is therefore not limited to any particular class of tubing.

Essentially, it consists, first, in the combination, in a machine for manufacturing tubes, of a hollow mandrel on which the inner lining is formed and means for maintaining a circulation of cooling medium through the mandrel to harden the plastic coating substance, so that said substance will not stick the lining to the mandrel and so that the windings will not embed too deeply in the coating substance; second, in a machine of the kind described, of means for coating the lining with said plastic substance; third, in a machine of the kind described, of means for winding on the reinforcing-windings; fourth, in a machine of the kind described, of a device for feeding the completed tube along as it is formed; fifth, in the combination of said cooling, coating, winding, and feeding devices, and with such other elements as are necessary to produce an operative machine for any given kind of tubing.

The drawings which accompany the specification illustrate a machine which is particularly adapted to the manufacture of conduits for electric-light wires, such as is described in United States Letters Patent No. 693,916, dated February 25, 1902; but the invention is not limited to machines for such specific purpose.

Figure 6:
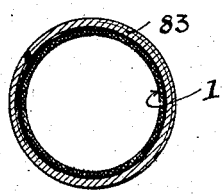
Figure 8:
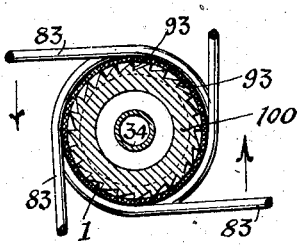
Figure 5:
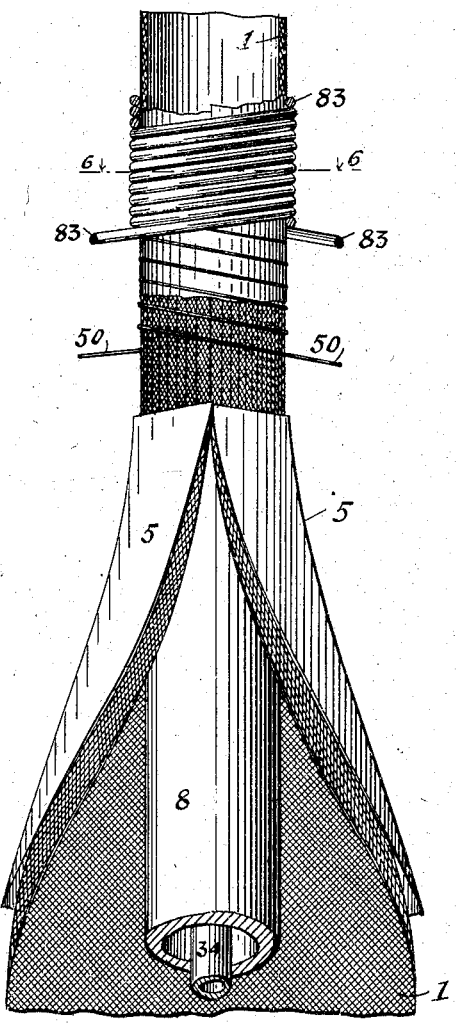
Figure 7:
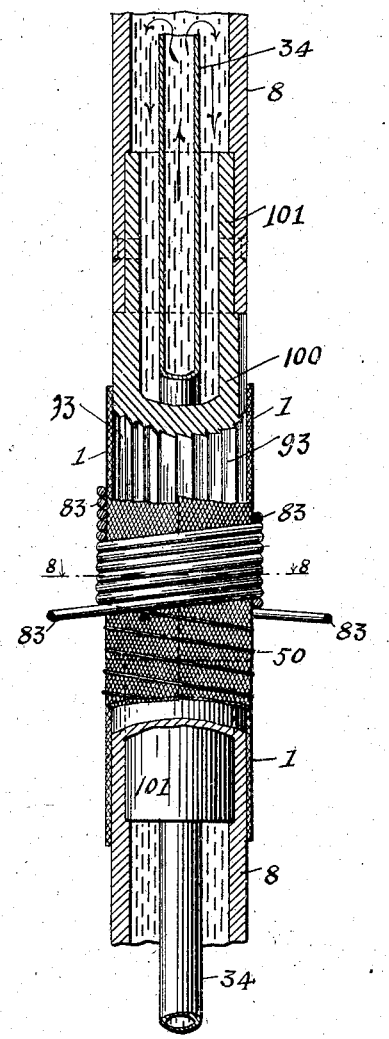

Referring to the said drawings, Figure 1 is a plan of the machine. Fig. 2 is a longitudinal vertical sectional elevation of the same. Fig. 3 is a broken longitudinal vertical section and elevation, on a large scale, of the parts of the machine to the left of Fig. 2 and including the smear-pot 70. In this view the sifter-box is shown provided with a rotary conical cam 18 for shaking the sifter-box. Fig. 4 is a broken longitudinal vertical section and elevation of certain parts at the center and to the right of Fig. 2 and indicating one set of picker-teeth 104 105. Fig. 5 is a broken longitudinal section and elevation, on a very large scale, of the former and adjacent parts of the mandrel and indicating two windings of the conduit. Fig. 6 is a cross-section of the same on the line 6 6 of Fig. 5. Fig. 7 is a broken longitudinal elevation and section on the scale of Fig. 5 and showing the "reamer" and other adjacent parts of the mandrel. This figure also indicates the windings of the conduit. Fig. 8 is a cross-section on the line 8 8 of Fig. 7.

A B are respectively the bed-plate and supports of the machine.

C is the counter-shaft, controlled by the friction-clutch D and driven through said clutch from pulley E.

The strip 1 of canvas or other suitable flexible material which forms the inner longitudinal lining of the conduit having been first treated with fireproofing solution, if so desired, (and previously having been cut to proper width,) and dried is unwound from reel 2 and drawn through the machine by the feed devices or picker-teeth, as hereinafter described, 3 3 being brackets in which the axle of reel 2 is supported. From reel 2 said strip 1 goes through a sheet-metal former 5, Figs. 2, 3, and 5, supported by a bracket 7 and having its front end curved concentric to a hollow mandrel 8. As said strip 1 is drawn through said former 5 it is curved around said mandrel 8, the edges of said strip preferably making a butt-joint. Just as said strip 1 enters said former 5 powdered soapstone or other lubricant is sifted on the strip from a sifter-box 10, which is shaken by the cam 12 on shaft C, intermittently engaging a roller 13 on a lever 15, which carries sifter-box 10, Fig. 1. In Fig. 3 the sifter-box is shown as pivotally supported at 16 and shaken by a cam 18, which is driven by a pulley 19 and a belt from pulley on shaft C. Any other means of shaking the shifter-box can of course be employed. The soapstone has the twofold advantage of diminishing the friction of the strip 1 on the mandrel 8 and also of smoothing the inner surface of the conduit. Said mandrel 8 is positioned by collars 24 24, which are arranged at the perforated cross-piece 26, carried on the standard 27, set-screws 29 29 fixing said mandrel 8 in said collars 24. Said mandrel 8 extends a little forward of the picker-teeth 128 129 and is closed by a solid plug 32. An open-end pipe 34 extends axially through said mandrel 8 from the hollow plug 35, in which is a drip 37, to near the front end of said mandrel. At its rear end said pipe 34 is connected with a reservoir containing a cooling medium, as ice-water. In the drawings the reservoir 40 contains a siphon 41, which is connected with pipe 34 by a rubber sleeve 42, said siphon being started by suction. The cooling medium being delivered to the front end of mandrel 8 by pipe 34 flows back through said mandrel to the drip 37, thereby cooling said mandrel and strip 1 for the purpose hereinafter explained. The escaping fluid is caught in any suitable receptacle. (Not shown.) Just in front of said former 5 the strip 1 receives a preliminary winding to hold said strip 1 closed around mandrel 8 with thread 50 from spools 52, carried on a pulley 54, which is driven by a belt 55 from a pulley 57 on shaft C. Said pulley 54 is carried on a hollow hub 60 concentric to mandrel 8 and turning with collar 61 in box 62, carried on a standard 63, Figs. 2 and 3. The thread 50 is guided through the eyes of brackets 64, fixed on said pulley 54, and 66 66 are the common spring tensions for the spools 52. The drawings show the said spools on the same pulley and revolving in the same direction; but they can of course be on separate pulleys revolving in opposite directions, whereby the threads cross each other, and if one breaks the other prevents it from unwinding. A short distance in front of said spools 52 is the smear-box 70, which contains any suitable waterproofing composition in a liquid or viscous condition, such a composition, for example, as is described in United States Letters Patent No. 693,916, dated February 25, 1902. Said composition is preferably melted in a vessel 72, supported on a standard 71, provided with a regulating spring-checked discharge-valve 73, from which it runs into the said smear-box 70. Both vessel 72 and box 70 are heated by gas-burners, 75 being the burners for vessel 72 and the burners for box 70 not being shown. Said smear-box 70 is supported on a standard 76 and is preferably made with an upper and a lower part 77 78, said parts being united on a horizontal line through the center of mandrel 8. The front and rear walls of each part of said smear-box 70 have half-round holes 80 81 at the joint, so that when said parts are united round holes are formed of such size as to allow the strip 1 to pass through the smear-box around mandrel 8 with easy fit. The two parts of the smear-box are held together by bolts, and by taking off the upper part the box is easily cleaned. As the strip 1 moves forward through the smear-box 70 it is coated by the waterproof composition, as indicated by the round shaded part of said strip to the right of the winding-threads in Fig. 3, and there is no objectionable leakage of the composition from the smear-box. As the composition touches the strip 1, which, as well as mandrel 8, is cooled by the circulating fluid in the mandrel, said composition hardens quickly and does not pass through the butt-joint of the strip 1 to the mandrel, and therefore the said strip is not stuck to the mandrel. Said cooling of the mandrel and the strip is a very important feature of the machine.

In front of smear-box 70 are the revolving spools 82 of the winding device, which winds the reinforcing-cord 83 around the smeared strip 1. Said spools are carried on axle-pins at the ends of arms 85, which are fixed on a revolving head 86. The long hollow hub 88 of said head 86 turns in a long box 90, supported on a standard 89, concentric to mandrel 8, and has a gear 91, driven by a gear 92 on shaft C. There are preferably four said spools, arranged to make a close winding of cord around strip 1, as shown, Figs. 2 and 5. From the spools said cord 83 is led through the tensions to said strip 1. Each of said tensions consists of two blocks 94 95, block 95 being fixed to an arm 96, carried by head 86, and block 94 is drawn toward block 95 by the spring 97, coiled around pin 98, which is fixed to block 94 and has a working fit through block 95. At their meeting edges said blocks 94 95 have half-round holes, which are smaller than cord 83, so that said blocks put the proper tension on the cord, as will be clearly understood. Said mandrel is provided with reamer-teeth 93 at the part where the spools 82 wind on cord 83—that is, from about $x$ to $y$, Fig. 4. Said teeth 98 are inclined, as shown, to resist the tendency of the rotary spools 82 to twist the strip 1 on mandrel 8, and for convenience in construction said teeth are preferably formed on a short separate section 100 of the said mandrel 8, sleeves 10 at the ends of said short section 100 being fitted in and secured to the ends of the long pieces of said arbor 8, as clearly indicated in Figs. 4 and 7, and to compensate for the slight reduction of circumference of the polygon which circumscribes said teeth the section 100 is made of a little greater diameter than the part of mandrel 8 which is to the left of said section 100, while the part of said mandrel to the right of said section 100 is still further slightly reduced in diameter to facilitate the feed of the strip forward over the end of said mandrel.

A short distance in front of the teeth 98 are the first set of "picker-teeth," which term signifies rolls 104 105, provided with concave peripheries, in which are set sharp pins 106, as is common in pickers. The pins are long enough to just catch into strip 1. Said rolls 104 105 are fixed on cross-shafts 109 110, respectively above and below said mandrel 8. Said shafts 109 110 have intermeshing gears 112 113, so that each roll is driven at the same speed, and a worm-gear 115 on shaft 110 is driven by a worm 116 on a counter-shaft 117, which is finally driven by a train of gears 120 121 122 from shaft C. By changing gear 120 the speed of the picker-teeth can be varied to suit the speed of the winding-spools 82, so as to keep the windings of cord 83 close and flat on strip 1. A short distance in front of the aforesaid picker-teeth 106 is a second set of similar picker-teeth 128 129 in general arranged and driven in the same manner as the former set. The speed of both sets of said picker-teeth is the same and is a little greater than the rate at which the spools 82 wind the cord on the strip 1, so that the picker-teeth pull said strip rapidly enough to prevent the windings of the cord from overlapping, and there is an advantage in having two sets of picker-teeth, since this prevents the pulling of the cord over the strip. The shafts of the picker-teeth and of the worms turn in boxes carried by the standards 135 136. A short distance in front of the second set of picker-teeth the mandrel 8 terminates, and the conduit, which is now hard and dry, feeds off to the floor or to winding-reels and is ready to receive its outer braided covering. The braiding is performed in the well-known braiding-machines, which may be in another part of the factory and are not shown in the accompanying drawings, though they might be on the same bed-frame as the machine here shown and driven in unison therewith, so as to take the conduit from mandrel 8 and cover it.

The process of manufacturing the conduit is not herein more particularly described or claimed, said process being set forth in another application for United States Letters Patent.

Now, having described my improvements, I claim as my invention—

1. The combination in a machine of the kind described, of a hollow mandrel, means for lubricating the mandrel a former for shaping a tube on the mandrel, a winding device for reinforcing the tube, means for coating the tube, and means for maintaining the circulation of a cooling medium in the mandrel, substantially as described.

2. The combination in a machine of the kind described, of a hollow mandrel, a former for shaping a tube on the mandrel, means for lubricating the mandrel, means for coating the tube, two winding devices, one for holding the tube on the mandrel and one for reinforcing the tube, and means for maintaining circulation of a cooling medium in the mandrel, substantially as described.

3. In a machine of the kind described, the combination of a hollow mandrel for forming a tube, means for lubricating the mandrel, means for coating the tube, a winding device for reinforcing the tube, means operating in unison with the winding device for moving the tube on the mandrel, and means for maintaining circulation of a cooling medium in the mandrel, substantially as described.

4. In a machine of the kind described, the combination with a mandrel for forming a tube, a winding device for reinforcing the tube, and rotary picker-teeth operating in unison with the winding device for moving the tube on the mandrel, substantially as described.

5. In a machine of the kind described, the combination of a mandrel for forming a tube, a winding device for reinforcing the tube, and two sets of rotary picker-teeth operating in unison with the winding device for moving the tube on the mandrel, substantially as described.

6. The combination in a machine of the kind described, of a mandrel for forming a tube, means for coating the tube, winding devices for applying filamentary bodies to the tube, and two sets of picker-teeth operating in unison with the winding devices for moving the tube on the mandrel, substantially as described.

7. In a machine of the kind described, the combination of a mandrel, and a former for forming a tube, means for lubricating the mandrel, means for coating the tube, winding devices for applying filamentary bodies to the tube, and two sets of picker-teeth operating in unison with the winding devices for moving the tube on the mandrel, substantially as described.

8. In a machine of the kind described, the combination of a mandrel for forming a tube, a receptacle for a coating composition for the tube, means for heating the receptacle and means for cooling the mandrel, substantially as described 9. In a machine of the kind described, the combination of a hollow mandrel for forming a tube, a receptacle for a coating composition for the tube, means for heating the receptacle, and means for maintaining circulation of a cooling medium in the mandrel, substantially as described.

10. In a machine of the kind described, the combination of a mandrel on which a tube is formed provided with teeth to prevent the tube from twisting on the mandrel, and a winding device for winding a filamentary body on said mandrel, substantially as described.

Signed at New York this 11th day of February, 1903.

EDWARD D. SPEER

Witnesses:
TAYLOR MORE,
DAVID WALTER BROWN.